June 8, 1943.  H. V. ALEXANDERSSON ET AL  2,320,996
REMOTE CONTROL SYSTEM
Filed April 14, 1941   4 Sheets-Sheet 1
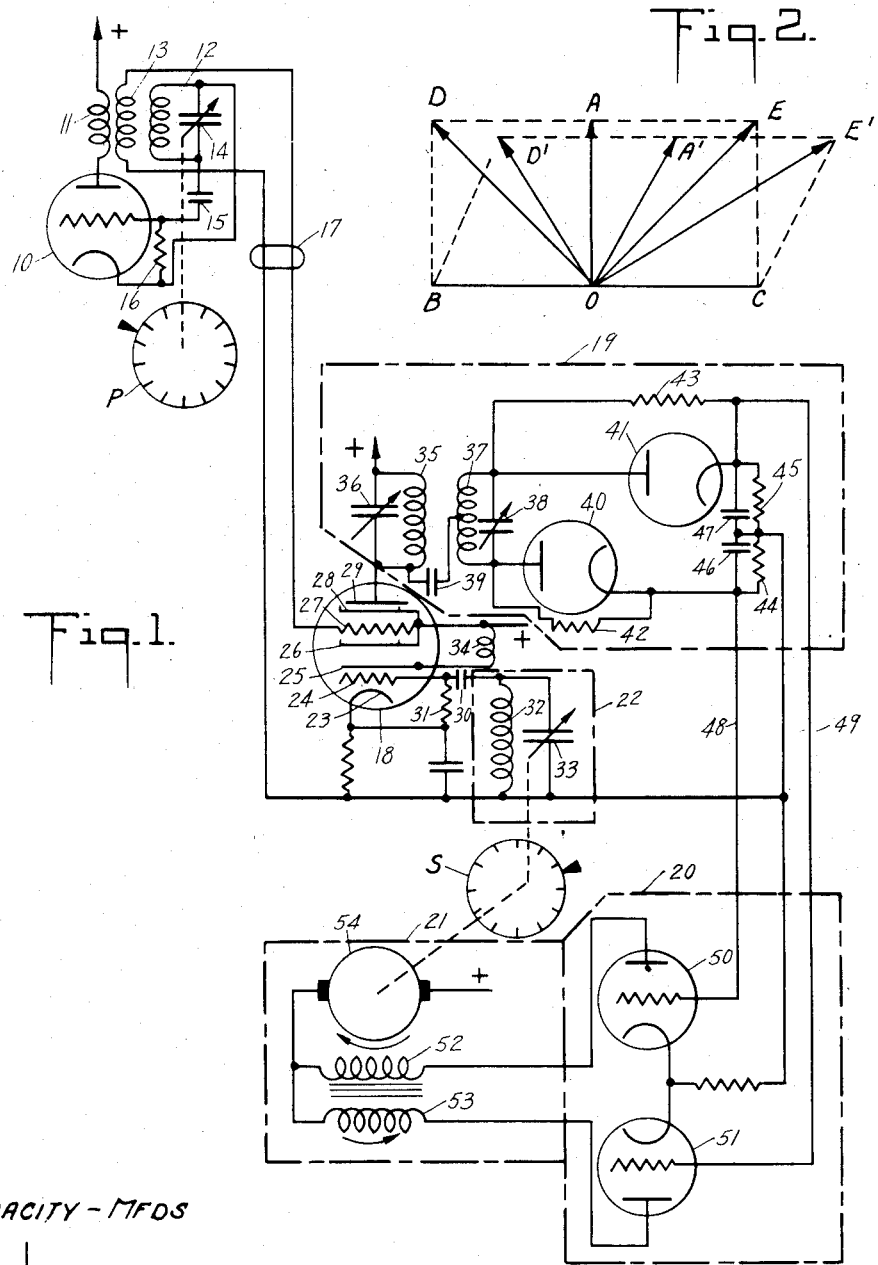
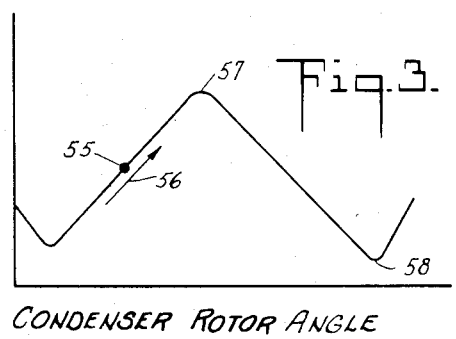
INVENTOR
Harald Valdemar Alexandersson
Carl Erik Grangvist
BY
their ATTORNEY

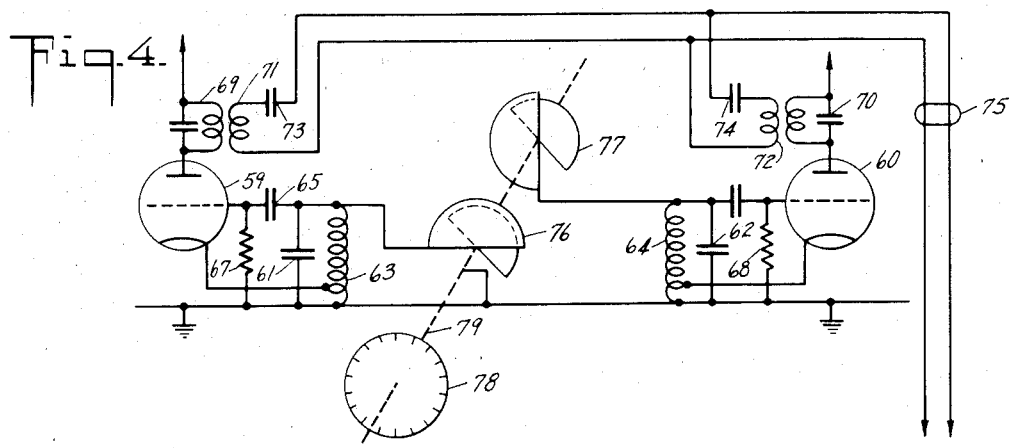
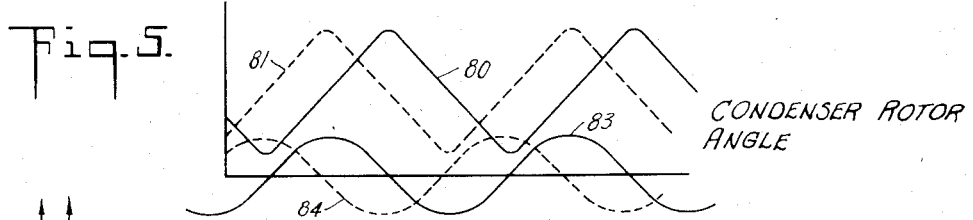
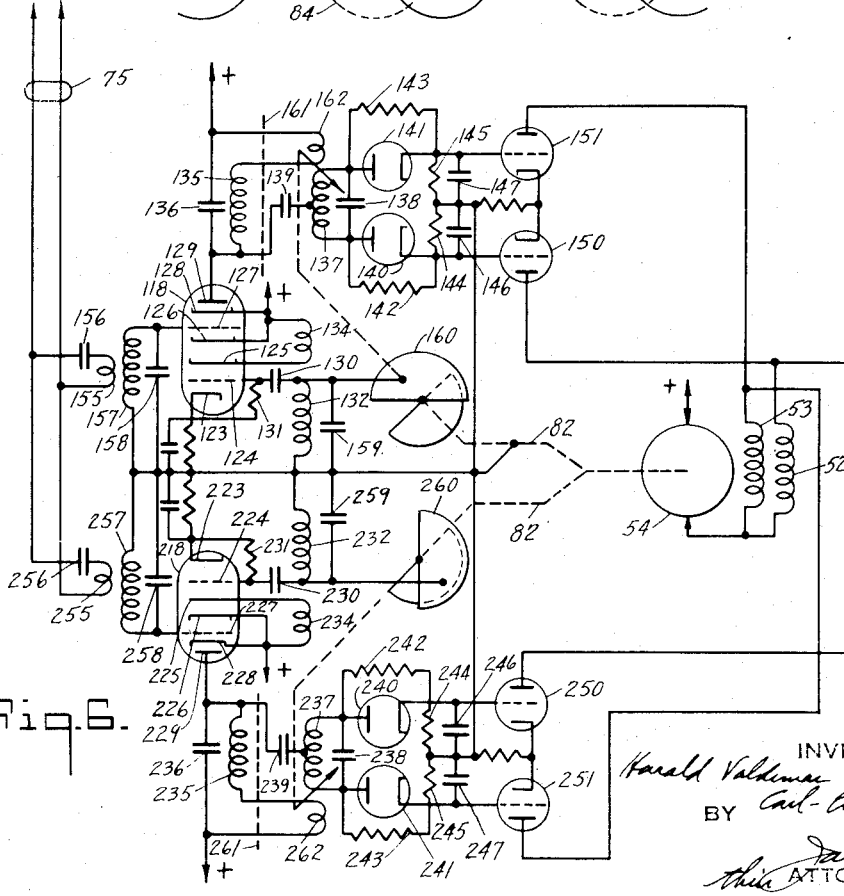

Patented June 8, 1943

2,320,996

UNITED STATES PATENT OFFICE 2,320,996

REMOTE CONTROL SYSTEM

Harald Valdemar Alexandersson, Lidingo, and Carl-Erik Granqvist, Stockholm, Sweden, assignors to Aga-Baltic Radio Aktiebolag, Stockholm, Sweden, a corporation of Sweden Application April 14, 1941, Serial No. 388,547
In Sweden April 15, 1940

7 Claims. (Cl. 172—239)

Our invention relates to remote control apparatus.

In remote control systems it has been proposed to arrange a transmitter in such a way that it transmits a radio-frequency alternating current the frequency of which is determined by the position of the transmitter control, and to arrange a receiver for the transmitted radio-frequency alternating current which is provided with automatic arrangements for tuning to the transmitted frequency, the automatic tuning arrangement being connected to the object to be controlled according to the momentary position of the transmitter control.

In remote control systems of this kind it is suitable to tune the transmitter and the receiver by means of tuning circuits, containing fixed induction coils and variable condensers, the shafts of which are connected to the transmitter control and to the object to be controlled, respectively.

Fig. 1 is schematic diagram of the known arrangement.

Figs. 2 and 3 are diagrams illustrating the operation of the system of Fig. 1;

Fig. 4 is a schematic diagram of a transmitter embodying the present invention;

Fig. 5 is a diagram illustrating the operation of the transmitter of Fig. 4;

Fig. 6 is a schematic diagram of a receiver for use with the transmitter of Fig. 4;

Figure 7:
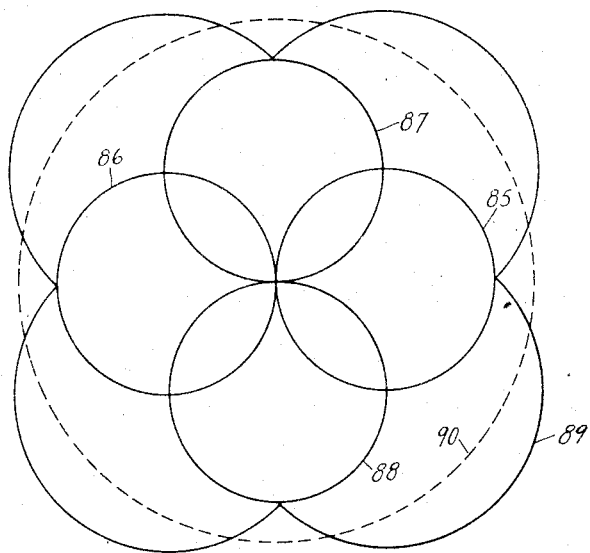
Fig. 7 is a diagram illustrating the operation of the receiver of Fig. 6.

In Fig. 1, 10 is the oscillator valve of the transmitter. In the anode circuit of the oscillator valve there is included a coil 11, which is inductively coupled to a coil 12 connected in the grid circuit of the valve 10, and to a further coil 13 connected by a transmission channel 17 to the receiver. The coil 12 is connected in parallel with a tuning condenser 14, mechanically connected to the transmitter control P, shown in the form of a dial. The resonance frequency of the tuned circuit formed by the coil 12 and the condenser 14 will thus vary with the position of the dial. The circuit 12—14 is connected by a grid condenser 15 and a grid leak 16 to the grid circuit of the valve 10 to form an oscillating circuit.

The principal parts of the receiver are a modulator 18, a discriminator 19, a direct current amplifier 20, a motor 21 for causing the movement of the secondary parts, to be controlled, and finally a tuning circuit 22 for the modulator oscillator, said tuning circuit being actuated by the motor 21 together with the secondary part S. For the sake of simplicity it has been assumed that a common valve of a well known type is used both as modulator and oscillator. This valve 18 contains a cathode 23, an oscillator grid 24, an oscillator anode 25, a first screen grid 26, a modulator grid 27, a second screen grid 28 and an anode 29.

The oscillator tuning circuit 22, consisting of coil 32 and tuning condenser 33, is connected between the grid 24 and the cathode 23 of the valve 18, through a grid condenser 30 and a grid leak 31. The oscillator anode 25 is connected to the plus terminal of the main through a reaction coil 34. By this arrangement oscillations are produced in the internal system of the valve 18, said oscillations being modulated by the oscillations received from the transmitter which are impressed on the control grid 27 of the external system to produce an interference oscillation of beat frequency similar to the operation of superheterodyne radio receivers.

In the anode circuit of the valve 18 is included a transformer which is tuned to the beat frequency. This transformer is made as a discriminator, that is, it is sharply tuned to the beat frequency and passes a current the direction and magnitude of which is determined by the variation in signal frequency. One example of such a discriminator is shown in Figure 1. The primary circuit contains the coil 35 shunted by the condenser 36, which can be adjusted to the beat frequency. The secondary circuit contains a corresponding coil 37, shunted by a condenser 38. In addition to the inductive coupling of the two circuits a further coupling is provided by connecting the mid point of the coil 37 through a condenser 39 to the high voltage side relative to alternating current, of the coil 35.

The discriminator is completed by two rectifiers 40 and 41, connected to earth and to the ends of the coil 37 and provided with the shunt resistors 42, 43 and series resistors 44 and 45. For alternating currents the latter resistors are shunted by by-pass condensers 46 and 47. The connection between the resistors 44 and 45 thus is connected to earth while the end terminals of these resistors are connected by conductors 48 and 49 to the grids of direct current amplifying electronic valves 50 and 51, respectively. The anode circuits of the valves 50 and 51 are connected in series with counteracting field windings 52 and 53 of the motor 21 to one terminal of the armature 54 of the motor, the other terminal of which is connected to the plus terminal of the mains. The shaft of the motor is connected to the tuning condenser 33 and also to the object S to be controlled, shown in the form of a dial.

The operation of this system is as follows:

To start with it will be assumed that the transmitter is tuned to a predetermined position on the dial P. A frequency dependent upon the position of the control dial P is transmitted through the conductors 17 to the modulator grid 27 of a valve 18 of the receiver. The oscillator is assumed to set up an oscillation of a frequency which combines with the frequency received from the transmitter to produce the beat frequency to which the circuits 35—36 and 37—38 are tuned.

In Fig. 2 the voltage vector of the circuit 35—36 is indicated by O—A. The voltage vector of the circuit 37—38 is indicated by B—C. It is well known that at absolute resonance the voltage vectors of the primary circuit and of the secondary circuit are exactly 90° out of phase relatively to one another. Due to the coupling through the condenser 39 the voltage O—A is added to half the voltage B—C in positive direction for application to the rectifier 40, and in negative direction for application to the rectifier 41. The former voltage is thus composed of the vectors O—A and O—C, while the latter voltage is composed of the vectors O—A and O—B. As will be seen from the diagram in Fig. 2 the two resultants O—D and O—E in this case are equal. Consequently both rectifiers 40 and 41 set up equal but counter-acting voltages over their load resistors, which after amplification in the electronic valves 50 and 51 are transmitted to the two windings 52 and 53 of the motor 21. The latter is consequently in balance and does not operate.

It will now be assumed that the setting of the transmitter is changed. The condenser 14 is thus shifted and the transmitter frequency is changed either to a higher or to a lower value. The beat frequency will therefor differ from its normal value either in the same direction as the transmitter frequency or in the opposite direction, dependent on whether the frequency of the oscillator tuning circuit 22 is above or below the transmitter frequency. The direction in which the beat frequency deviates is of no importance as regards the operation, as in every case the direction, is dependent upon the direction of deviation of the transmitter frequency. The beat frequency, however, after the position of the dial P has been changed, is no longer in exact resonance with the circuits 35—36 and 37—38. Hence the two vectors O—A and B—C will assume a mutual phase position other than perpendicular to one another, and shifted by an angle depending upon whether the frequency displacement has been inductive or capacitive. With reference to the diagram this may be most easily explained by assuming that one of the vectors, for example the vector O—A, has turned relative to the other vector B—C as indicated by the vector O—A'. As will be seen from Figure 2 this causes the resultant O—E' of the vector O—A' and of the vector O—C to become greater than the former resultant O—E of the vectors O—A and O—C, whereas on the other hand the resultant O—D' of the vectors O—A' and O—B become less than the resultant O—D of the vectors O—A and O—B. As a result one of the rectifiers 40 or 41, for example the rectifier 40, receives a higher voltage and the voltage balance between the load resistors of the rectifiers is destroyed. With a greater voltage drop across the load resistor 44 the grid voltage of the valve 50 falls and the anode voltage of this valve also falls. Simultaneously the voltage drop across the load resistor 45 decreases so that the grid voltage of the valve 51 rises and the anode current of this valve also rises. Unequal currents flow through the windings 52 and 53 and the motor 54 turns in for example counter-clockwise direction.

The motor 54 thus changes the setting of the oscillator condenser 33 and gradually brings this to a value such that the beat frequency is restored to the frequency to which the circuits 35—36 and 37—38 are tuned.

In these earlier proposed arrangements, however, certain disadvantages are present. For example, the transmitter condenser can only vary from minimum value to maximum value representing for normal condensers a mechanical range of variation of half a revolution. Often, however, this is not sufficient for obtaining the desired range of movement or sufficient precision in the receiver. In such cases it is desirable to make the arrangement capable of operating in such a way that the control means of the transmitter can be turned more than half a revolution, in many cases even a plurality of revolutions, the controlled means of the receiver thereby turning a corresponding number of revolutions. This is, however, as explained below, impossible with an arrangement of the kind shown above.

The capacity of a tuning condenser varies during one revolution between a maximum through a minimum and back to the same maximum value. For each revolution of the shaft of the condenser such a cycle of capacity variation is obtained, as shown in Fig. 3 in which the vertical axis represents the capacity and the horizontal axis represents the angular setting of the condenser. It may now be assumed that the arrangement is set in a position corresponding to point 55 in Fig. 3 and that a movement is begun from this position in the direction indicated by the arrow 56. The change in transmitted frequency produces a corresponding change in its beat frequency which thus increases or decreases, dependent upon whether the oscillator frequency is above or below the signal frequency. The change in frequency causes an unbalanced voltage to be set up across the two rectifiers, and as a consequence of this voltage the motor is started. The direction of movement of the motor, however, is determined by relation between the beat frequency and the discriminator frequency. It may now be assumed that the oscillator frequency is higher than the signal frequency. The capacity, rising from the point 55, will then cause a decreasing signal frequency, which will cause an increasing beat frequency and the motor is rotated in a direction to restore the original beat frequency.

After the condenser 14 of the transmitter has passed its maximum, represented by point 57 in Fig. 3, the capacity will again decrease, thereby causing an increasing signal frequency. The beat frequency decreases to the value to which the discriminator is tuned, and thereafter the beat frequency will remain lower than the discriminator frequency until the condenser 14 has again reached a reversal point, in this case the minimum point 58. During this period the motor in the receiver will continuously rotate in the opposite direction until it reaches its end position. Hence, if the condenser 14 should be turned a plurality of revolutions the receiver would follow the movement of the transmitter during the first half revolution only, rapidly moving back to its initial position during the second half revolution of the transmitter, following the transmitter during its third half revolution, again rapidly returning to the initial position, etc.

The present invention relates to an arrangement by which this disadvantage is obviated. According to the invention the discriminator is arranged in such a way that the control voltage for the remote control motor reverses its direction as the capacity curve of the condenser changes from rising to falling or vice versa. The reversal of the control voltage or current may take place either in the discriminator or in some other place in the control channel. A number of different arrangements of this kind are shown below.

At the moment when the control voltage or current reverses its polarity this voltage or current will be zero. Hence, at the point of reversal the system loses its power of following the movement of the transmitter with precision. This disadvantage is obviated according to a further embodiment of the invention by providing two cooperating transmitter units acting upon different receivers, the discriminators of which are connected to the same remote control motor. The condensers of both of said transmitters, however, are mechanically displaced in relation to each other in such a way that one of the condensers is in a position in which good precision is obtained when the other condenser is in a position of less precision and vice versa.

Fig. 4 shows an arrangement of a transmitter for two frequencies, intended to be connected to a receiver such as that shown in Fig. 6.

The transmitter according to Fig. 4 contains two electronic valves 59 and 60, coupled as oscillators. The oscillation circuits contain one condenser 61 or 62, respectively, and one coil 63 or 64, respectively. The cathodes of the electronic valves are connected to taps on the respective coils, whereas the high voltage terminals of the coils are connected to the control grids of the electronic valves over condensers 65 and 66, provided with grid leaks 67 and 68, respectively, in a known manner.

In the anode circuit of each of the valves 59 and 60 is a broadly tuned circuit 69 and 70, respectively, said circuit transferring with substantially the same amplitude all frequencies which may be set up by the oscillator valves. The circuits are coupled to coils 71 and 72, respectively, which are connected by means of blocking condensers 73, 74 to the transmission mains 75 leading to the receiver.

The condensers 61 and 62 are dimensioned in relation to the coils 63 and 64 to tune to a frequency which is not substantially higher than the highest frequency which is to be produced by the oscillator. For obtaining a frequency variation condensers 76 and 77 are connected in parallel to the tuned circuits. These condensers are mechanically connected with each other and with the transmitter control dial 78 as by a common shaft 79. The stators of the two condensers 76 and 77 are displaced in relation to the rotors of the said condensers in such a way that the capacity of one of the condensers is at or near its minimum value when the capacity of the other condenser is a minimum or maximum.

The capacity variation of the two condensers is shown in Fig. 5, the vertical axis as in Fig. 3 indicating the capacity and the horizontal axis indicating the angular setting of the condenser. The curve 80, drawn in full, shows the variation of the capacity of one of the condensers whereas the dotted curve 81 shows the variation of the capacity in the other condenser.

A receiver for the signal emanating from the transmitter in Fig. 4, is shown in Fig. 6, said receiver being in general substantially the same as the receiver, shown in Fig. 1. The transmission mains are indicated at 75 as in Fig. 4. Otherwise the same reference numerals have been used as in Fig. 1 except that in the two parts of the receiver of Fig. 6, the hundreds-figures 1 and 2, respectively, have been added.

The transmission mains 75 are connected to both of the receiver units through transformers containing the primary windings 155 and 255 and blocking condensers 156 and 256. The secondary windings 157 and 257 are broadly tuned by the condensers 158 and 258 to the mean frequency of the received frequency band.

The condenser 33 in Fig. 1 is replaced in Fig. 6 by two condensers 159 and 259, and variable condensers 160 and 260, respectively, coupled in parallel. In the discriminators the inductive coupling is made variable by means of a variometer. For this purpose the primary and secondary circuits are screened from each other by means of screens 161 and 261, respectively, and the primary circuits are connected in series with the primary coils 162 and 262, respectively, of variometers, the secondary coils of which are formed by the secondary coils 137 and 237, respectively, of the discriminator. Both of the variometers and both of the condensers are connected to a common mechanical control from the motor 54, as indicated by the dotted line 82. This mechanical connection is made so that the variometers are at zero coupling when the corresponding condensers pass through their maximum or minimum positions. In Fig. 5 this is indicated by the full line curve 83 corresponding to the capacity variation curve 80 of the condenser 160, and by the dotted curve 84 which corresponds to the capacity variation curve 81 of the condenser 260.

By this arrangement an extremely uniform movement of the receiver is obtained. Assuming that the variometers are moving with pure sine variation in coupling, the polar curve for the variation in coupling will be obtained in the form of two circles touching each other, for example the circles 85 and 86 in Fig. 7 for one of the variometers and, due to the mechanical phase displacement of 90°, the circles 87 and 88 for the other variometer. The sum of the coupling voltages through both of the variometers, which also determines the current fed to the field windings 52 and 53 of the motor 54, is then obtained in Fig. 7 in form of the curve 89 which varies only about plus or minus 15% from a true circle as indicated by curve 90.

Figure 8:
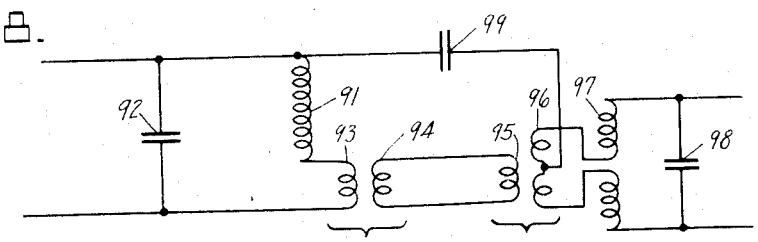
Figs. 8 and 9 are diagrams illustrating a novel form of variometer for use in the receiver of Fig. 6.
Figure 9:
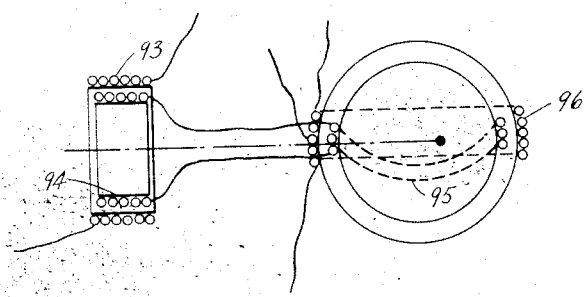

The operation of the variometers shown in Fig. 6 may cause certain difficulties, as sliding contacts must be avoided due to the small voltages involved, as well as due to the capacity of sliding contacts which may be too high when the higher radio frequencies are used for the control. In Figs. 8 and 9 an arrangement is shown for obtaining a variometer without using movable contacts. In these figures the coil of the primary circuit in the discriminator is indicated at 91 and the condenser coupled in parallel therewith is indicated at 92. In series with the coil 91 there is arranged a coil 93. This coil is wound on a cylindrical coil frame in the interior of which is arranged a coaxial cylindrical coil frame carrying a coupling winding 94. This coupling winding is arranged on the same shaft as the primary winding 95 of the variometer, said last named winding being so arranged that upon the rotation of the variometer, a continuous and preferably purely sinusoidal coupling variation to the secondary coil 96 is obtained. As a matter of symmetry this last named secondary coil is arranged with a mid point tap and is connected between the two half parts of the secondary winding 97 of the discriminator. The last named winding is finally coupled in parallel with the condenser 98, corresponding to the condensers 138 and 238, respectively. A condenser 99 connects the mid-point on the secondary winding 96 with the primary winding 91.

Figure 10:
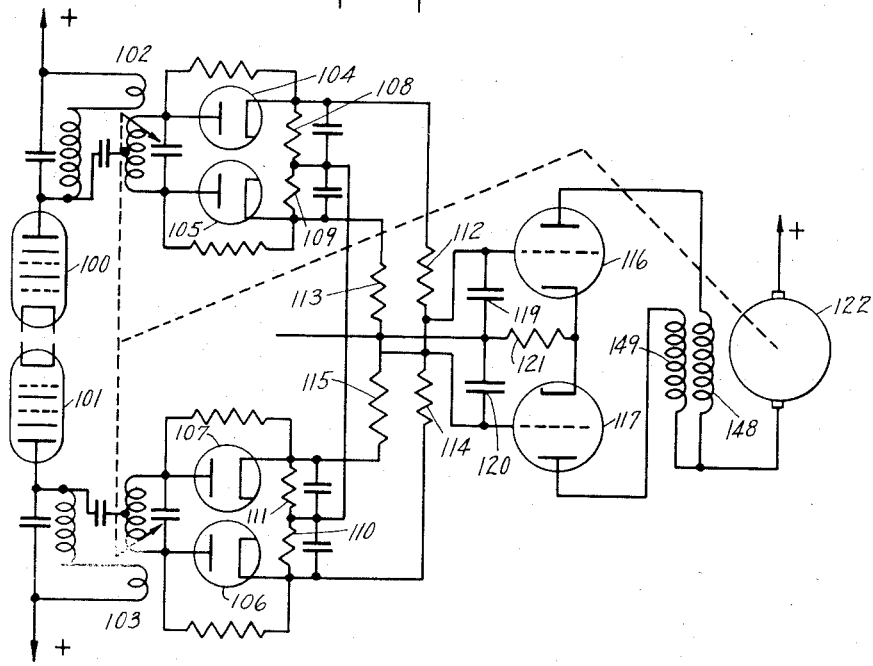
Figs. 10 and 11 are schematic diagrams illustrating further embodiments of the invention.
Figure 11:
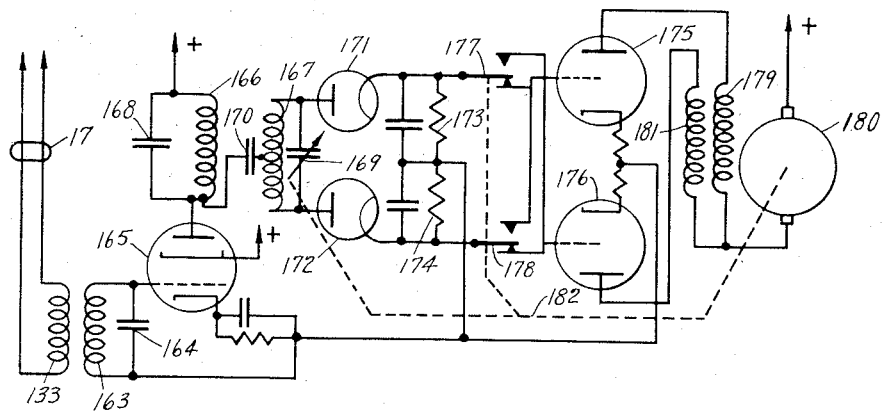

In Figs. 10 and 11 two modifications of the arrangement according to Fig. 6 are shown. In the arrangement according to Fig. 6 the two direct current amplifying electronic valves 150 and 151 and also 250 and 251, respectively, were so connected to the field windings 52 and 53 of the motor 54, that the sum of the currents flowing through the anode circuits of the electronic valves in question passed through the field windings. At balance between these currents no movement of the motor was obtained as the two field windings were opposed. The arrangement according to Fig. 10, however, is such that the difference between the voltages created in the two rectifiers is fed to the field windings. In this case the direct current amplifying electronic valves can be omitted as will be evident from the following.

The coupling from the transmitter to the two modulator valves 100 and 101 is assumed to be made in any manner suitable for the purpose, for example as shown in Fig. 6. The discriminators 102 and 103 are also made in a suitable manner. The discriminator 102 is connected to the two rectifier valves 104 and 105, whereas the discriminator 103 is connected to the two rectifier valves 106 and 107. The direct current voltages from the rectifiers in question across the resistors 108, 109, 110 and 111 are fed to four resistors 112, 113, 114 and 115, coupled in pairs. The connection point between the resistors 112 and 114 and also between the resistors 113 and 115 are connected to the control grids of amplifier valves 116 and 117, respectively, provided with by-path condensers 119 and 120 and a common cathode bias resistor 121. The anode circuits are connected in the field windings 148 and 149 of the motor 122.

In cases where a high precision is not required this may be substantially simplified. It is primarily possible to make the discriminator itself tunable instead of using a tunable oscillator circuit to obtain an intermediate frequency adapted to a fixed discriminator. Further only one channel may be used from the transmitter to the receiver instead of two channels and finally it is not necessary to make the reversal of the discriminator voltage continuous, a mechanical switching arrangement being used. An arrangement, simplified in these three respects for receiving a remote control signal is shown in Fig. 11.

The transmission mains 17 from the transmitter, such as the transmitter shown in Fig. 1 are connected to a broadly tuned transformer, the primary winding of which is indicated at 133 and the secondary winding 163 of which is coupled in parallel with a condenser 164 for tuning approximately to the mean value of the transmitted frequency band. The signal is amplified by means of a standard amplifier valve 165 in the output circuit of which a transformer is connected containing the primary winding 166 and the secondary winding 167. The primary winding is coupled in parallel with a fixed condenser 168 by means of which this circuit is tuned to a frequency within the transmitted frequency range. The secondary winding 167 is coupled in parallel with a condenser 169 by means of which said secondary winding is tunable over the same frequency range as the transmitter. Preferably the condenser 169 is so shaped that the receiver during the automatic tuning always turns through the same angle as the transmitter.

The coils 166 and 167 are connected as described above by means of a condenser 170 for obtaining the discriminator action. The terminals of the coil 167 are connected to rectifiers 171 and 172 which are connected to load resistors 173 and 174. The connection point between the two load resistors is grounded, whereas the two ungrounded terminals are connected to the control grids of two direct current amplifier valves 175 and 176 by means of two contact arms 177 and 178. The counter contacts for the contact arms are so arranged that the contact arms, which are mechanically connected together, when in one position connect the resistor 173 with the amplifier valve 175 and the resistor 174 with the amplifier valve 176 but when in their other position connect the resistor 173 with the amplifier valve 176 and the resistor 174 with the amplifier valve 175. The anode current from the valve 175 flows through the field winding 179 of the motor 180, whereas the anode current from the valve 176 flows through the field winding 181.

The shaft 182 of the motor 180 is coupled mechanically to actuate the tuning condenser 169 as well as the switching arms 177—178, so that the arms are switched over from one position to the other each time the condenser 169 passes through maximum or minimum capacity positions. By this arrangement the receiver is prevented from reversing its direction at each half revolution of the transmitter control as in Fig. 1.

Of course the invention is not limited to the embodiments shown. Various modifications may be made therein as will be apparent to a person skilled in the art.

What is claimed:

1. A remote control system responsive to frequency variations of a received signal, comprising a receiver having a circuit responsive to the received signal, a rotatable tuning element passing progressively through maximum and minimum positions during its rotation, said tuning element being connected to control the frequency response characteristics of said receiver, a reversible motor connected to actuate said tuning element, a motor control circuit responsive to the relative frequency characteristics of said receiver and of the received signal and connected and arranged to cause said tuning element to follow variations in signal frequency, and a circuit connected to cause said motor to continue operation in the same direction in response to continued unidirectional variation in frequency of the received signal as the tuning element passes through its maximum or minimum position.

2. A remote control system responsive to frequency variations of a received signal, comprising a receiver having a circuit responsive to the received signal, a rotatable tuning element passing progressively through maximum and minimum positions during its rotation, said tuning element being connected to control the frequency response characteristics of said receiver, a reversible motor connected to actuated said tuning element, a motor control circuit responsive to the relative frequency characteristics of said receiver and of the received signal and connected and arranged to cause said tuning element to follow variations in signal frequency, and reversing connections connected and arranged to automatically reverse the control of said motor control circuit as the tuning element passes through its maximum or minimum position.

3. A remote control system responsive to frequency variations of a received signal, comprising a receiver having a circuit responsive to the received signal, a rotatable tuning element passing progressively through maximum and minimum positions during its rotation, said tuning element being connected to control the frequency response characteristics of said receiver, a reversible motor connected to actuate said tuning element, a motor control circuit responsive to the relative frequency characteristics of said receiver and of the received signal and connected and arranged to cause said tuning element to follow variations in signal frequency, and reversing connections actuated by said tuning element and constructed and arranged to automatically reverse the control of said motor control circuit as the tuning element passes through its maximum or minimum position.

4. A remote control system responsive to frequency variations of a received signal, comprising a receiver having a circuit responsive to the received signal, a rotatable tuning element passing progressively through maximum and minimum positions during its rotation, said tuning element being connected to control the frequency responsive characteristics of said receiver, a reversible motor connected to actuate said tuning element, a motor control circuit responsive to the relative frequency characteristics of said receiver and of the received signal and connected and arranged to cause said tuning element to follow variations in signal frequency, and reversing connections connected and arranged to reverse the phase of a voltage component of the motor control circuit so as to automatically reverse the control of said motor control circuit as the tuning element passes through its maximum or minimum position.

5. A remote control system responsive to frequency variations of a received signal, comprising a receiver having a circuit responsive to the received signal, a rotatable tuning element passing progressively through maximum and minimum positions during its rotation, said tuning element being connected to control the frequency response characteristics of said receiver, a reversible motor connected to actuate said tuning element, a motor control circuit responsive to the relative frequency characteristics of said receiver and of the received signal and connected and arranged to cause said tuning element to follow variations in signal frequency, and reversing connections comprising a variometer connected and arranged to automatically reverse the control of said motor control circuit as the tuning control circuit passes through its maximum or minimum tuning position.

6. A remote control system responsive to frequency variations of a received signal, comprising a receiver having a circuit responsive to the received signal, a rotatable tuning element passing progressively through maximum and minimum positions during its rotation, said tuning element being connected to control the frequency response characteristics of said receiver, a reversible motor connected to actuate said tuning element, a motor control circuit responsive to the relative frequency characteristics of said receiver and of the received signal and connected and arranged to cause said tuning element to follow variations in signal frequency, said motor control circuit comprising a pair of inductive coupling members connected in cascade, one of said members comprising a variometer rotatable with said tuning element, the other of said members comprising coaxial coils the axis of which coincides with the axis of rotation of said variometer.

7. A remote control system responsive to frequency variations of a pair of received signals which are displaced in frequency and are varied in frequency in the same sense, comprising a receiver having circuits selectively responsive to the two received signals, a pair of rotatable tuning elements passing progressively through maximum and minimum positions, said tuning elements being mechanically connected to rotate in unison and relatively displaced as to their maximum and minimum positions, said tuning elements being respectively connected to control the frequency response characteristics of said receiver circuits, a reversible motor connected to actuate said tuning elements, a motor control circuit responsive to the combined effect of the relative frequency characteristics of said receiver circuits and of the received signals and connected and arranged to cause said tuning elements to follow variations in their respective signal frequencies, said circuits being connected and arranged to cause said motor to continue operation in response to variations in frequency of one of said signals while the tuning element cooperating with the circuit responsive to the other of said signals is passing through its maximum or minimum position.

HARALD VALDEMAR ALEXANDERSSON.
CARL-ERIK GRANQVIST.